Jan. 27, 1942. C. S. ASH 2,270,918
DUAL WHEEL VEHICLE
Filed June 23, 1939 4 Sheets-Sheet 1

INVENTOR
Charles S. Ash
BY Morgan Finnegan and Durham
ATTORNEYS

Jan. 27, 1942.  C. S. ASH  2,270,918
DUAL WHEEL VEHICLE
Filed June 23, 1939  4 Sheets-Sheet 2

INVENTOR
Charles S. Ash
BY
Morgan Finnegan & Durham
ATTORNEYS

Jan. 27, 1942.   C. S. ASH   2,270,918
DUAL WHEEL VEHICLE
Filed June 23, 1939   4 Sheets-Sheet 3
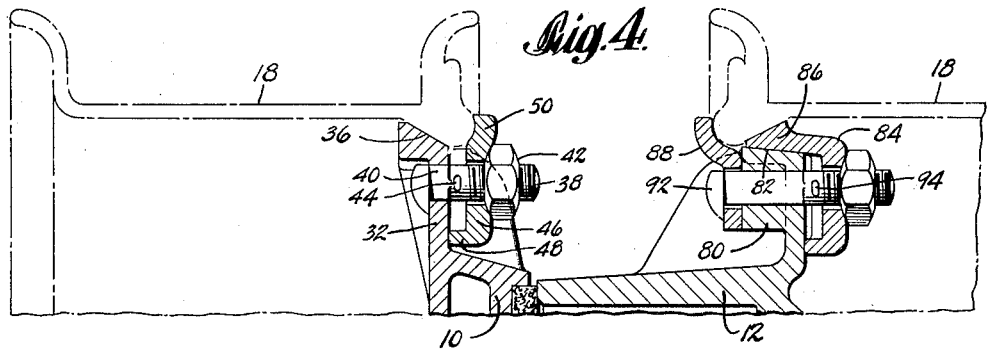
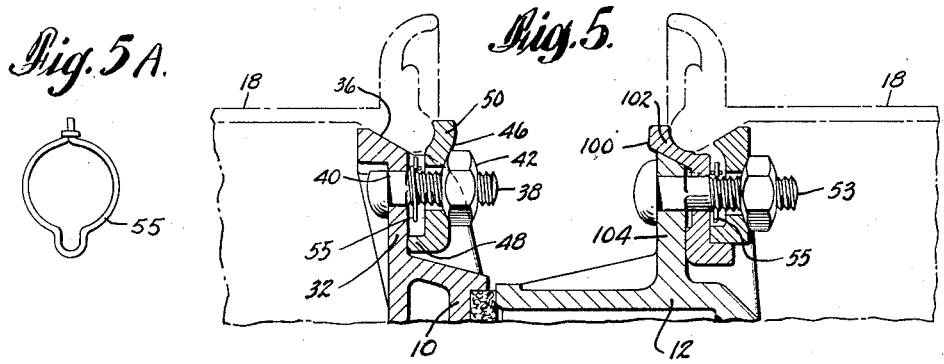
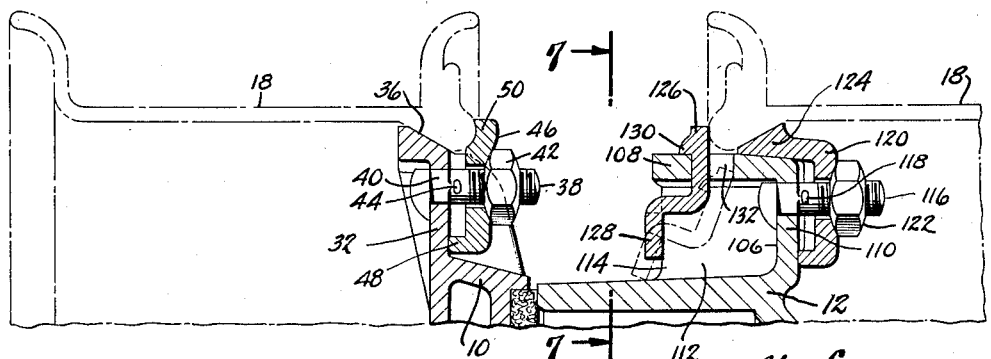
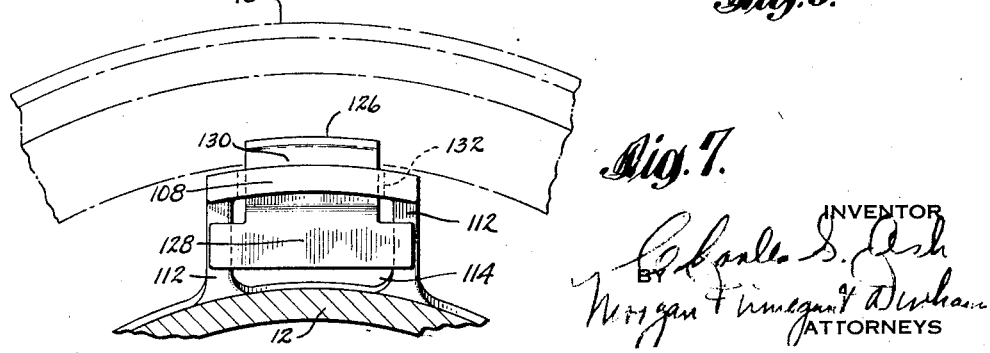
INVENTOR
Charles S. Ash
BY Morgan Finnegan & Durham
ATTORNEYS

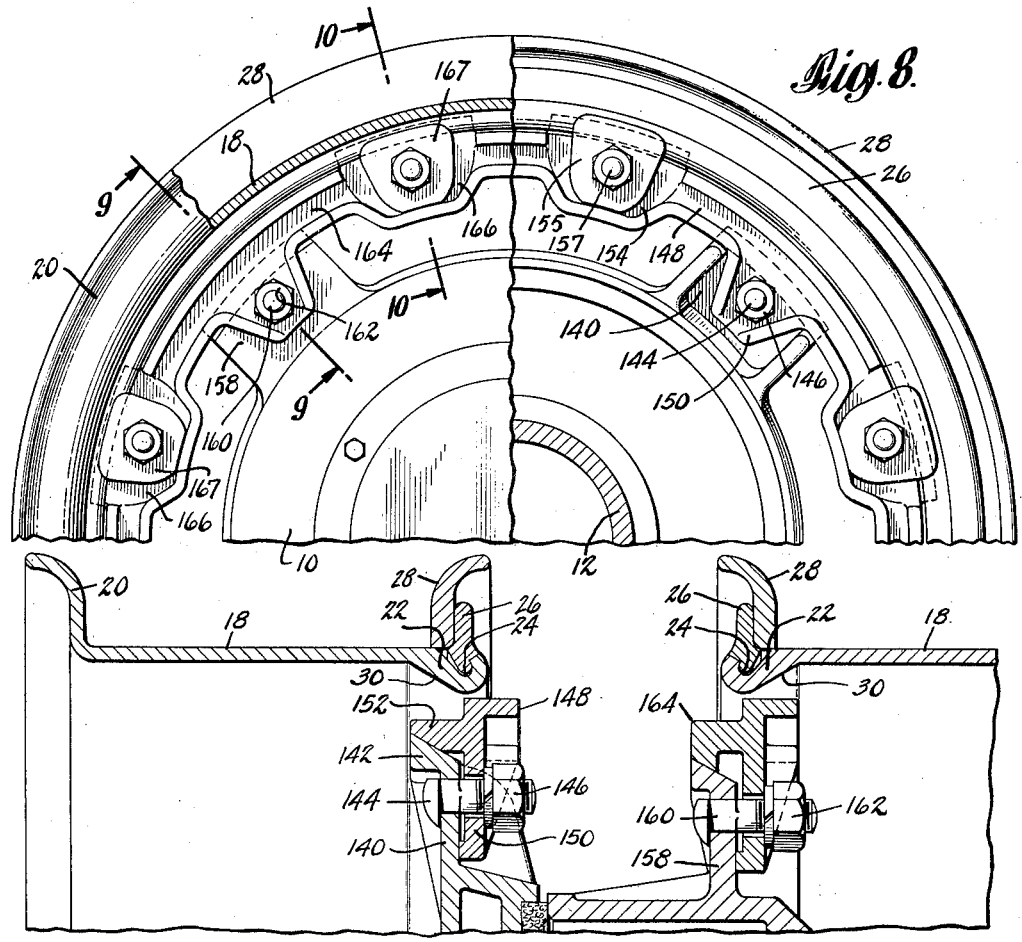
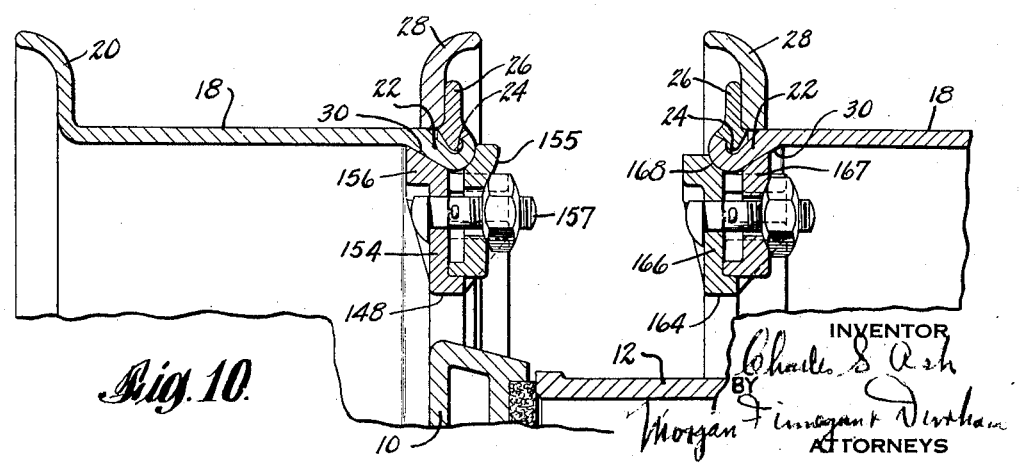

Patented Jan. 27, 1942

2,270,918

UNITED STATES PATENT OFFICE 2,270,918

DUAL WHEEL VEHICLE

Charles S. Ash, Milford, Mich.

Application June 23, 1939, Serial No. 280,741

3 Claims. (Cl. 301—13)

The present invention relates to new and useful improvements in dual wheel assemblies and more particularly to such novel improvements in connection with the mounting of the inner and outer tire rims on the dual wheels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate modifications of the invention, and together with the description, serve to explain the principles of the invention.

Of the drawings:

Fig. 4 is a fragmentary section corresponding to the upper portion of Figure 1 showing a modified form of rim clamping means;

Fig. 5 is a section similar to Figure 4 but showing another modification of clamping means;

Fig. 5A is a face view of a spring retaining member;

Fig. 6 is a section showing a further modification for clamping the rims to the wheels;

Fig. 7 is a section taken along the line 7—7 of Figure 6;

Fig. 8 is a fragmentary face view partly broken away showing clamping and adapting means for securing various sized rims to the dual wheels;

Fig. 9 is a section taken on the line 9—9 of Figure 8;

Fig. 10 is a section taken on the line 10—10 of Figure 8.

Figure 1:
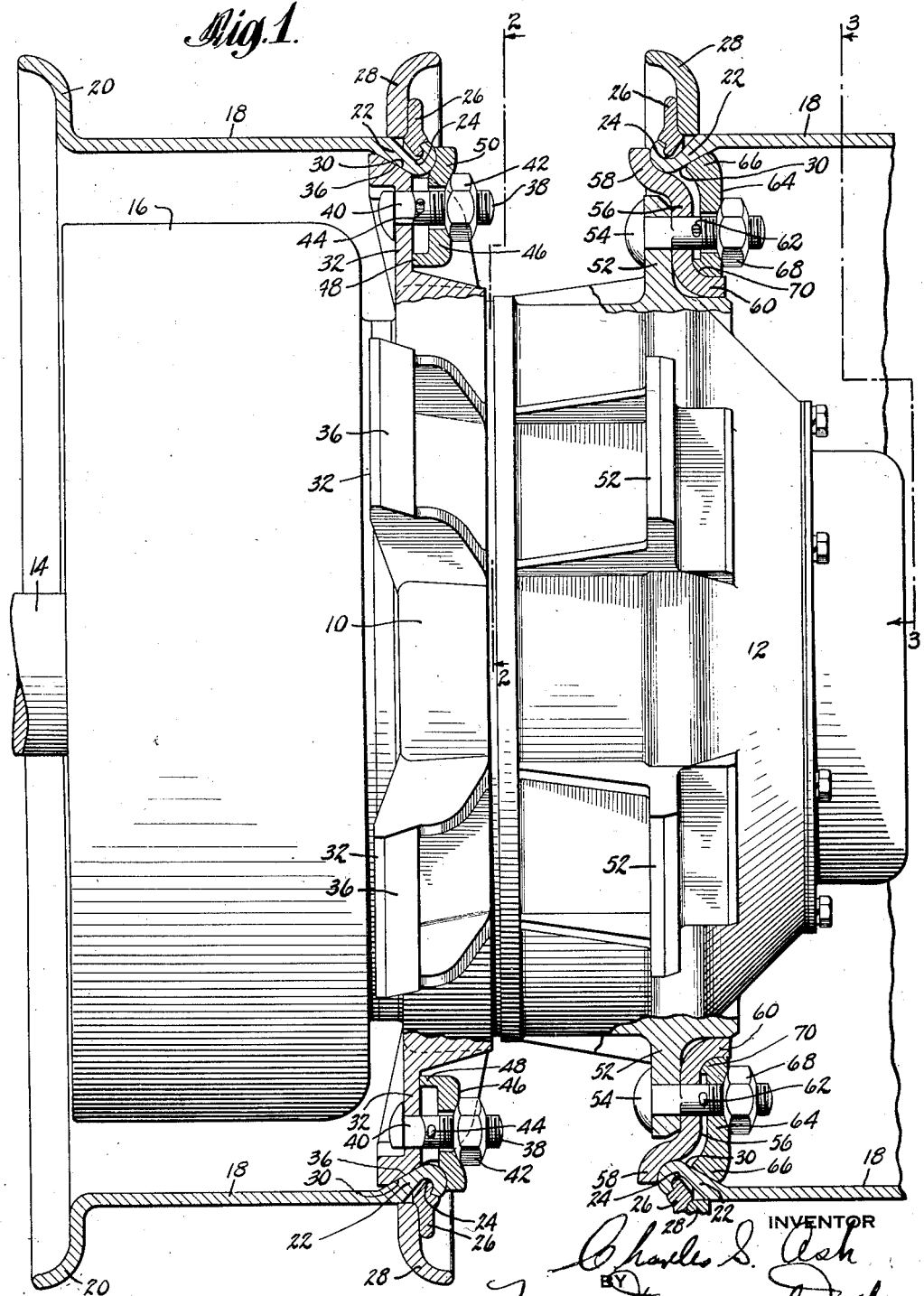
Fig. 1 is a side elevation partly in section of a dual wheel and tire rim showing the means for clamping the rims on the wheels.

The present invention has for its object the provision of a novel and improved demountable rim, dual wheel structure providing maximum ease in the removal and remounting of both the inner and outer tire rims, as well as a relatively small number of simple parts. The invention has for a further object the provision of a demountable rim dual wheel assembly in which the inner and outer wheels may be remounted securely and in proper alinement with certainty. The invention also provides a dual wheel structure which can accommodate standard demountable rims without requiring the use of split or other forms of retaining rings, and at the same time permitting the removal of the inner ring without disassembly of the wheel structure. The invention further provides a novel means of mounting different sizes of tires and rims on a single size of wheel.

In certain respects, the present invention is an improvement on a modification of the structure shown and described in my previous and copending application Ser. No. 265,880, filed April 4, 1939, for Rim mounting for dual wheels, but in other respects the present invention is of more general application.

In the mounting of demountable rims on dual wheels, it has been proposed, as in the patent to Higbee No. 1,975,273, to provide a separate retaining ring which is split and cooperates with the rim and is of smaller diameter than the rim, to hold the inner rim in place on the attaching lugs of the inner wheel. This structure is somewhat disadvantageous and more costly as it requires the use of a separate ring which must be removed from the inner rim, expanded and then removed over the attaching lugs on the outer wheel, and when in place, this rim serves to firmly seat the inner rim on the lugs which are spaced slightly inwardly of the inner rim. In this way, it is possible to use an inner rim of sufficiently larger diameter so that it may be passed over a similar lug construction on the outer wheel. However, this type of construction requires the use of non-standard rims together with a split or expansible ring which is removable with difficulty under certain conditions.

In accordance with the present invention, a standard form of rim is employed for both the inner and outer tires and the inner rim is secured to the peripheral portion of the inner wheel by substantially conventional rim securing and locating lugs, while the outer rim, of similar and preferably duplicate construction, is secured to and located on the peripheral portion of the outer wheel by lugs which are completely removable, the removal of the lugs from the outer wheel reducing the overall diameter of the outer wheel sufficiently so that the inner rim may be removed from the inner wheel and over the outer wheel by simple axial movement of the rim.

According to a modification of the present invention, the foregoing objects and benefits are achieved, and means are provided which also permit different sizes of rims to be used on the same wheel, so that tires and rims of a larger or smaller diameter may be substituted one for the other.

It will be understood that the foregoing general description, and the following detailed description as well, are exemplary and explanatory of the invention but are not restrictive thereof.

Figure 2:
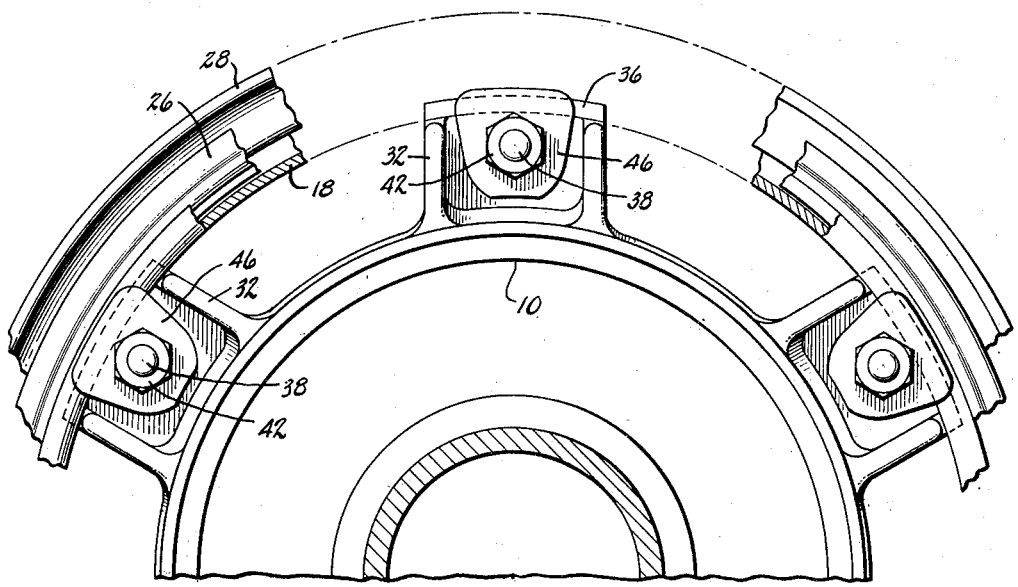
Fig. 2 is a section, partly broken away, taken on the line 2—2 of Figure 1.
Figure 3:
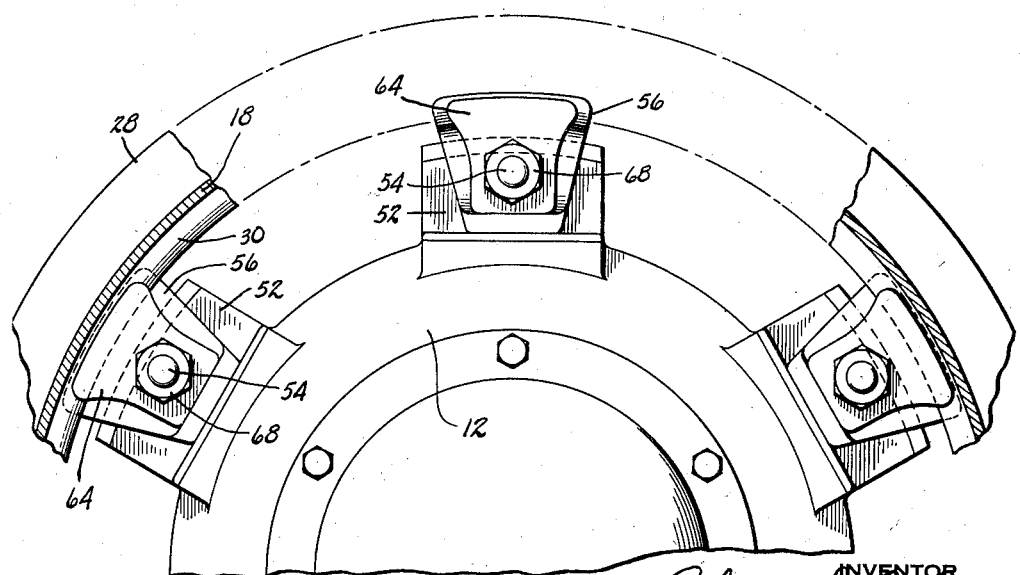
Fig. 3 is a fragmentary section taken along the line 3—3 of Figure 1.

Referring in detail to the drawings and more particularly to the embodiments shown in Figures 1 to 3, an inner and outer wheel 10 and 12 of a dual wheel unit are shown as being mounted for independent rotation upon an axle 14 which may be provided in the usual manner with ball or roller bearings (not shown). A brake drum 16 may be provided in operative relation with either one or both of the wheels 10 and 12 and is illustratively shown as mounted adjacent the inner side (left in Figure 1) of the inner wheel 10 whereby it may be conveniently operated by conventional braking mechanism (not shown).

The pneumatic tires, which are omitted from the drawings, are mounted on the wheels 10 and 12 by the usual tire rim 18 having upon one side of its cylindrical portion a flared flange 20 which acts as an abutment for one wall of the tire. The other side of the rim 18 is tapered inwardly, as indicated at 22, to provide means for locking the tire on the rim and for mounting the rim upon the wheel. As embodied, the outer surface of the tapered portion 22 is formed as a groove 24 into which may be sprung the split locking ring 26. A removable tire retaining flange 28 corresponding in shape to the flared flange 20 serves, in conjunction with locking ring 26, to removably secure the tire upon the rim 18, and the inner tapered or conical surface 30 of the tapered portion 22 serves as the supporting and clamping means whereby the rim 18 is removably secured to the wheels.

The inner wheel 10 of the dual wheel unit is provided with a series of spoke-like radial projections 32 upon which the rim 18 and its tire is supported and clamped. As constructed the projections 32 are channel-shape in cross section and provided with a head portion having an inclined surface 36 which forms the seat for the conical surface 30 of the rim 18. Removable clamping means for securely holding the rim 18 on the spoke projections 32 are provided and as embodied comprise bolts 38 having formed thereon, beneath the head, a squared shank 40, and a threaded end upon which a clamp nut 42 is carried. The bolts 38 are secured in the spoke projections 32 by cotter pins 44 and held against rotation therein by the square shank 40. Clamp lugs 46, having a fulcrum toe 48 and clamp head 50, serve to force the conical surface 30 of the rim upon the seat 36 of the wheel 10 when the clamp nuts 42 are tightened.

The outer wheel 12 is also provided with a series of spoke-like projections 52 but differing from those of the wheel 10 in that their outermost diameter is such as to allow the rim 18, which is intended for mounting on the inner wheel, to be passed over them. Bolts 54 having a squared shank portion are carried in square holes in the spoke projections 52.

Means for supporting and clamping a rim 18 and its tire on the spoke projections 52 of the outer wheel are provided and as embodied comprise support lugs 56 mounted on the bolts 54 and having an offset head 58 to form a seat for the rim and a foot 60 which bears upon the wheel 12 adjacent the base of the spoke projections 52.

A cotter pin 62 retains each support lug 56 in place on the bolt 54. A clamp lug 64, also carried on each bolt 54, is provided and as embodied has a head portion 66 whose inclined surface wedges the rim 18 against the support lug 56 when the clamp nut 68 is tightened. The base 70 on the clamp lug 64 bears on the foot 60 of support lug 56.

The construction as illustrated and described thus provides a dual wheel unit upon which tires and rims of substantially identical size and shape may be separately and independently mounted, and having a minimum of removable members. The unit also allows the inner tire and rim to be secured on or be demounted from the inner wheel by passing it over the outer wheel. When it is desired to mount tires and rims on the dual wheel the operator first removes the clamp nuts 68, clamp lugs 64, cotter pins 62 and support lugs 56 from the outer wheel 12, and clamp nuts 42 and clamp lugs 46 from the inner wheel 10. A rim 18, with a tire mounted thereon, is then passed over the outer wheel 12 in such a manner as to bring the conical surface 30 upon the seats 36 formed on the inner wheel 10. Clamp lugs 46 and nuts 42 are then replaced on bolts 38 and the nuts screwed up tight to secure the rim and tire in place. The operator than replaces the support lugs 56 upon bolts 54, where they may be held by replacing cotter pins 62, and then places the second tire and rim 18 in place on the support lugs in clamping position whereupon the clamp lugs 64 and nuts 68 are replaced and tightened to thus secure the tire and rim 18 upon the outer wheel 12.

In Figure 4 there is shown a modified form of the invention in which the spoke projections on the wheel serve both as the supporting and as wedging means for the tire rim. As embodied, the spoke projections 80 are enlarged to form bosses having a peripheral inclined surface 82. Clamp lugs 84 are provided with a corresponding incline on the underside of their heads 86 and a reversed incline on their outer or top surfaces for contacting and wedging the conical surface 30 of the tire rim 18. Abutment lugs 88 are provided to properly position the rim 18 and serve as the fixed member against which the wedging action takes place. Abutment lugs 88 are rotatably mounted on the inner face of the spoke projections 80 by means of the bolts 92 which are carried therein. A cotter pin 94 retains each abutment lug and bolt in assembled position.

When it is desired to remove the inner tire and rim from the dual wheel the outer tire is demounted by removing the clamp lugs 84 and then rotating the abutment lugs 88 about the bolts 92 until the offset head on each lug 88 is no longer in the path of the rim to be removed from the inner wheel.

Figure 5 shows another modification of the outer wheel construction wherein the support lugs for the tire rim are supported upon the periphery of the spoke projections, thereby differing from the form shown in Figure 1 which transmits the load to the wheel at the base of the spoke projections. As embodied, each support lug 100 is provided with a head portion 102 whose undersurface is inclined to coact with a corresponding peripheral surface on the spoke projections 104. The support lug is mounted upon the bolt 53 and held in place thereon by a removable spring ring 55, and the method of removing the inner tire rim over the outer wheel is generally the same as that described in connection with the construction shown in Figure 1, with the exception that the spring ring 55, instead of the cotter pin 62, is removed to free the support lug.

In Figures 6 and 7 there is shown still another form of outer wheel construction wherein the member which serves to position the tire rim and provide the fixed point against which it is wedged is removably interlocked in the spoke projection and is independent of the clamp bolt. As embodied, the spoke projections 106 are box-shaped, having a peripheral top wall 108, an outer side 110, two lateral sides 112 and an open inner side 114. Each of the spoke projections 106 are provided with a clamp bolt 116 having a squared shank portion and held in place by a cotter pin 118. A clamp lug 120 and nut 122 are carried by each of the bolts 116. The head 124 of the clamp lugs 120 is provided with two inclined surfaces, one for cooperating with a similar surface on the top wall 108 of the spoke projection and the other for cooperating with the conical surface 30 on the tire rim 18.

Stop lugs 126 are provided for positioning the tire rim 18 and resisting the wedging action of the clamp lugs 120, and as embodied, are constructed with a T-shaped bottom portion 128 and an offset top portion having a tooth 130 which, when the lug is in its operative position, hooks over one edge of an enlarged opening 132 in the top wall 108 of the spoke projection. The ears of the T-shaped bottom portion 128 of the lug 126 lie against the edges of the lateral walls 112 of the spoke projections and maintain the lug 126 in its operative position for acting as a stop for the tire rim 18.

When it is desired to remove the tire from the inner wheel, the outer tire is demounted by removing the clamp lugs 120 and then manually disengaging the tooth 130 from the edge of the enlarged opening 132 when the stop lug 126 will drop into the box shaped spoke projection, as shown in broken lines in Figure 6, and thereby be out of the path of the inner tire which it is desired to remove from the dual wheel.

In Figures 8, 9 and 10, there is shown a modified embodiment wherein the spoke projections on the inner and outer wheels are substantially identical in form and the means whereby the inner tire rim may be passed over the outer wheel in mounting and demounting consists of adapter rings removably bolted to the spoke projections of each wheel and carrying means for clamping the tire rims thereon. As embodied, the inner wheel 10 is provided with spoke projections 140 having a head portion 142 with an inclined surface. Clamp bolts 144 having a squared shank portion are carried by the spoke projections and, with their nuts 146 serve as the means whereby an adapter ring 148 is secured to the wheel 10. The adapter ring 148 is substantially circular in form and carries a series of inwardly projecting portions 150 having holes therein, through which the bolts 144 extend, and a support shelf 152 having on its underside an inclined surface for cooperating with a similar surface on the head 142 of the spoke projections 140. Interspaced between the portions 150 are rim supporting portions 154 the head 156 of which is provided with an inclined surface which acts as a seat for the conical surface 30 of the tire rim.

Clamp lugs 155 and bolts 157 are carried by the support portions 154 and serve to securely lock the tire rim 18 on the adapter ring.

The outer wheel 12 is provided with spoke projections 158, clamp bolts 160, nuts 162 and an adapter ring 164 which are, in construction and function, similar to those described in connection with inner wheel 10 with the exception that the rim support portion 166 is modified to form a seat 168 for the edge of the tire rim 18 against which the latter is wedged by clamp lugs 167.

In this embodiment, when it is desired to remove the inner tire from the wheel 10, the outer tire and rim is removed from its path by removing the outer adapter ring 164 with its tire and rim intact thereon from the outer wheel 12, after which, by removing the clamp lugs 155 on the inner adapter ring 148, the inner tire and rim 18 may be passed over the outer wheel 12.

In the embodiment illustrated in Figures 8, 9 and 10 the adapter rings 148 and 164 have a further advantage in that, by constructing them with a greater or lesser outside diameter, tire rims of various sizes may be adapted for use on the same dual wheel unit.

The invention in its broader aspects is not limited to the specific mechanisms shown and described but departures may be made therefrom within the scope of the accompanying claims without departing from the principles of the invention and without sacrificing its chief advantages.

What I claim is:

1. A demountable rim wheel including a wheel member having a generally circular periphery, spaced-apart slots in the periphery of the wheel and wall members inwardly of the slots, inner lugs insertable through said slots to extend radially outwardly therethrough for engagement with the inner side of the rim, each of said lugs having a fulcrum portion to engage the wall member, and a tooth to engage the wheel at the slot to prevent accidental disengagement of the lug, and outer lugs secured to the wheel by threaded means and moved thereby to clamp the rim between the inner and outer lugs.

2. A demountable rim wheel including a wheel member having a generally circular periphery, spaced-apart slots in the periphery of the wheel and wall members inwardly of the slots, inner lugs insertable through said slots to extend radially outwardly therethrough for engagement with the inner side of the rim, each of said lugs having a fulcrum portion to engage the wall member, and outer lugs secured to the wheel by threaded means and moved thereby to clamp the rim between the inner and outer lugs.

3. A demountable rim wheel including an inner lug and an outer lug having inwardly inclined converging faces on their peripheral surfaces to engage the inner portion of the rim, screw means on the wheel forcing the outer lug inwardly of the wheel, said wheel being slotted inwardly of the wheel and adjacent the lug, said inner lug being provided with an inwardly extending portion to pass through the slot and to be fulcrumed on a portion of the wheel.

CHARLES S. ASH.